(12) United States Patent
Shigenobu et al.

(10) Patent No.: US 9,578,193 B2
(45) Date of Patent: Feb. 21, 2017

(54) QUICK OPERATION USER INTERFACE FOR A MULTIFUNCTION PRINTING DEVICE

(71) Applicant: KYOCERA Document Solutions Inc., Osaka (JP)

(72) Inventors: Dai Shigenobu, Concord, CA (US); Mrinalini Chakravarty, Concord, CA (US); Damion Gordon, Concord, CA (US); Chris Holmes, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/674,119

(22) Filed: Mar. 31, 2015

(65) Prior Publication Data

US 2016/0295040 A1 Oct. 6, 2016

(51) Int. Cl.
*H04N 1/04* (2006.01)
*H04N 1/00* (2006.01)
*G06F 3/0481* (2013.01)
*G06F 3/0482* (2013.01)
*G06F 3/0488* (2013.01)
*H04N 1/44* (2006.01)

(52) U.S. Cl.
CPC ........ *H04N 1/00424* (2013.01); *G06F 3/0482* (2013.01); *G06F 3/0488* (2013.01); *G06F 3/04817* (2013.01); *H04N 1/00411* (2013.01); *H04N 1/4406* (2013.01); *H04N 2201/0094* (2013.01)

(58) Field of Classification Search
USPC ... 358/1.13, 1.14, 1.15, 1.16, 1.17; 715/835, 715/821, 702; 399/12, 81; 345/173
See application file for complete search history.

(56) References Cited

U.S. PATENT DOCUMENTS

| | | | |
|---|---|---|---|
| 2007/0212100 A1* | 9/2007 | Kimoto | G03G 15/502 399/81 |
| 2010/0169834 A1* | 7/2010 | Wakizaka | G06F 3/04817 715/821 |
| 2010/0321312 A1* | 12/2010 | Han | G06F 1/1694 345/173 |
| 2011/0145764 A1* | 6/2011 | Higuchi | G06F 3/0482 715/835 |

(Continued)

*Primary Examiner* — Jerome Grant, II
(74) *Attorney, Agent, or Firm* — McDonnell Boehnen Hulbert & Berghoff LLP

(57) ABSTRACT

Example methods and systems may include displaying a primary screen having a plurality of function menus corresponding to multifunction printer functions, wherein each function menu includes a function icon, one or more major-setting icons, an execution icon, and an expansion icon. The example methods and systems may include, responsive to the selection of a major-setting icon, modifying a corresponding primary setting; responsive to the selection of an execution icon, causing a multifunction printing device to carry out a function; responsive to the selection of an expansion icon, displaying the function menu as a selected menu, wherein the selected menu is larger and includes more major-setting icons; and, responsive to the selection of a function icon, displaying a secondary screen, wherein the secondary screen includes one or more major-setting icons corresponding to one or more primary settings, and one or more minor-setting icons corresponding to one or more secondary settings.

17 Claims, 7 Drawing Sheets

(56) References Cited

U.S. PATENT DOCUMENTS

| | | | |
|---|---|---|---|
| 2014/0189594 A1* | 7/2014 | Hashiba | G06F 3/0483 715/835 |
| 2014/0233967 A1* | 8/2014 | Suzuki | G03G 15/502 399/12 |
| 2014/0317500 A1* | 10/2014 | Kim | G06F 3/0481 715/702 |

* cited by examiner

QUICK OPERATION USER INTERFACE FOR A MULTIFUNCTION PRINTING DEVICE

BACKGROUND

1. Field of the Invention

Unless otherwise indicated herein, the description in this background section is not prior art to the claims in this application and is not admitted to be prior art by inclusion in this section. The present disclosure relates generally to methods and systems for displaying information via a user interface and controlling a multifunction printer using the user interface.

2. Description of the Related Art

Modern image forming devices are becoming increasingly complex as a result of added functions, applications, and services. For example, some image forming devices may include the ability to copy, scan, email, fax, and/or store documents and document data. These devices may be called multifunction printers, or multifunction printing devices, herein referred to as MFPs. These MFPs may include user interfaces which allow users to take advantage of the available functions. One such user interface may include a touch screen with a display, which may act as a control panel for an MFP. A user may be able to control the MFP by interacting with the touch screen.

SUMMARY

In a first aspect, a method is provided. The method preferably includes displaying a primary screen, wherein the primary screen comprises: a plurality of function menus, wherein each function menu corresponds to a function of a multifunction printing device, and wherein each function menu includes: a function icon, wherein the function icon corresponds to the function of the function menu; one or more major-setting icons, wherein the one or more major-setting icons correspond to one or more primary settings of the function; an execution icon, wherein the execution icon corresponds to a decision to carry out the function of the function menu; and an expansion icon. The method also includes, responsive to receiving an input corresponding to a selection of the major-setting icon, modifying the primary setting that corresponds to the selected major-setting icon; responsive to receiving an input corresponding to a selection of the execution icon, causing the multifunction printing device to carry out the function corresponding to the selected execution icon; responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes; and, responsive to receiving an input corresponding to a selection of the function icon, displaying a secondary screen, wherein the secondary screen comprises: one or more major-setting icons corresponding to one or more primary settings of the function corresponding to the selected function icon; and one or more minor-setting icons corresponding to one or more secondary settings of the function corresponding to the selected function icon.

In a second aspect, a system is provided. The system preferably includes a touch screen display; a multifunction printing device; a memory; and a processor, wherein the processor is configured to carry out instructions stored in the memory, wherein the instructions include displaying a primary screen on the touch screen display, wherein the primary screen comprises: a plurality of function menus, wherein each function menu corresponds to a function of the multifunction printing device, and wherein each function menu includes: a function icon, wherein the function icon corresponds to the function of the function menu; one or more major-setting icons, wherein the one or more major-setting icons correspond to one or more primary settings of the function; an execution icon, wherein the execution icon corresponds to a decision to carry out the function of the function menu; and an expansion icon. The instructions also include, responsive to receiving an input corresponding to a selection of the major-setting icon, modifying the primary setting that corresponds to the selected major-setting icon; responsive to receiving an input corresponding to a selection of the execution icon, causing the multifunction printing device to carry out the function corresponding to the selected execution icon; responsive to receiving an input corresponding to a selection of the expansion icon, displaying, on the touch screen display, the function menu corresponding to the selected expansion icon as a selected menu, wherein the selected menu is displayed larger than the function menu, and wherein the selected menu includes more major-setting icons than the function menu includes; and, responsive to receiving an input corresponding to a selection of the function icon, displaying a secondary screen on the touch screen display, wherein the secondary screen comprises: one or more major-setting icons corresponding to one or more primary settings of the function corresponding to the selected function icon; and one or more minor-setting icons corresponding to one or more secondary settings of the function corresponding to the selected function icon.

In a third aspect, a non-transitory computer-readable medium is provided. The non-transitory computer-readable medium has stored thereon computer instructions that, upon execution by a processor, cause the performance of a set of acts including displaying a primary screen, wherein the primary screen comprises: a plurality of function menus, wherein each function menu corresponds to a function of a multifunction printing device, and wherein each function menu includes: a function icon, wherein the function icon corresponds to the function of the function menu; one or more major-setting icons, wherein the one or more major-setting icons correspond to one or more primary settings of the function; an execution icon, wherein the execution icon corresponds to a decision to carry out the function of the function menu; and an expansion icon. The instructions also include, responsive to receiving an input corresponding to a selection of the major-setting icon, modifying the primary setting that corresponds to the selected major-setting icon; responsive to receiving an input corresponding to a selection of the execution icon, causing the multifunction printing device to carry out the function corresponding to the selected execution icon; responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes; and, responsive to receiving an input corresponding to a selection of the function icon, displaying a secondary screen, wherein the secondary screen comprises: one or more major-setting icons corresponding to one or more primary settings of the function corresponding to the selected function icon; and one or more minor-setting icons corresponding to one or more secondary settings of the function corresponding to the selected function icon.

DETAILED DESCRIPTION

Figure 1:
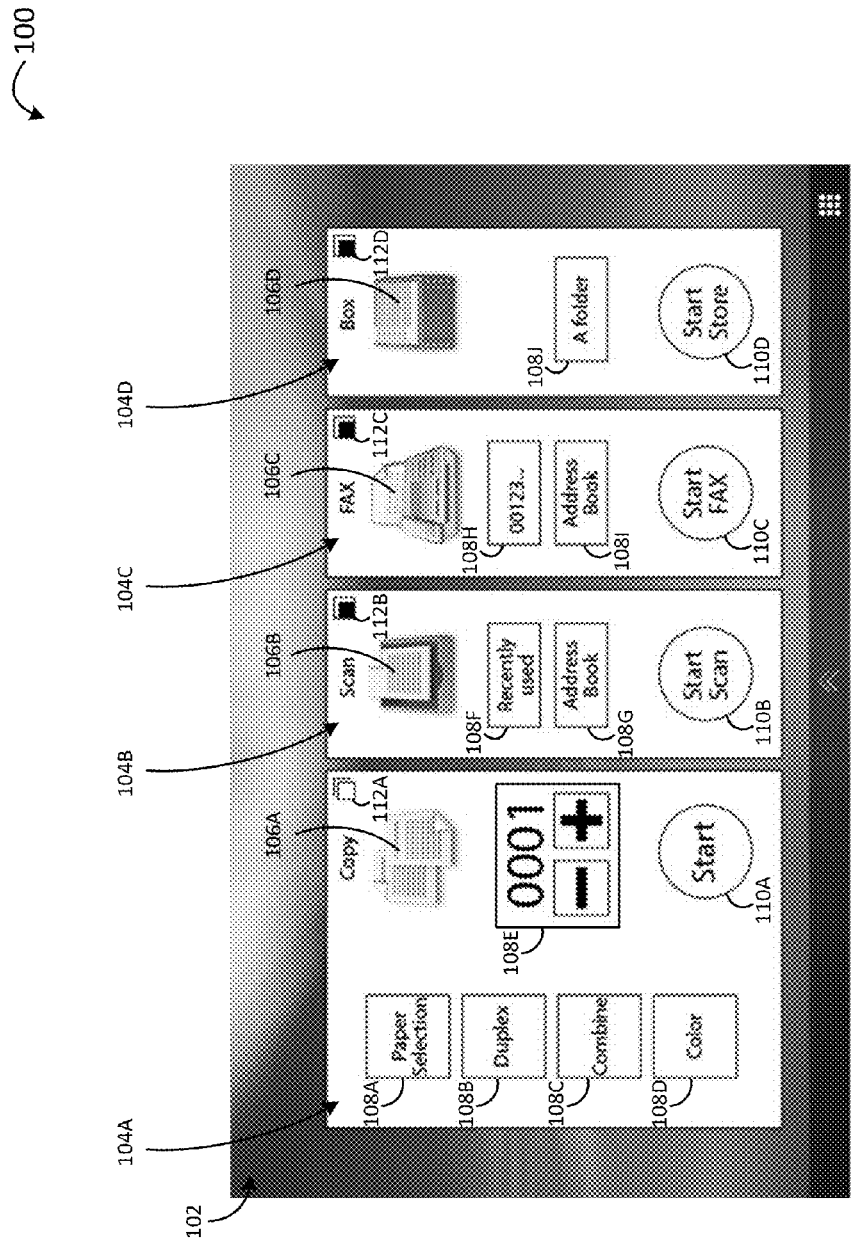
FIG. 1 is a diagram illustrating an example user interface according to an embodiment of the present disclosure.

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. Aspects of the present disclosure, as generally described herein, and illustrated in the figures, can be arranged, substituted, combined, separated, and designed in a wide variety of different configurations, all of which are explicitly contemplated herein.

I. Overview

As noted above, multifunction printing devices, or MFPs, may include the ability to carry out a wide variety of functions such as printing, storing, receiving, and transmitting documents, for example. A user may wish to select a function from the plurality of functions and control the MFP in order for the selected function to be carried out. In general, users control MFPs through the use of a control panel connected to the MFP.

Traditional control panels may have included physical buttons that corresponded to each function, such as a scan button, fax button, and copy button, for example. However, a more modern control panel may include a display screen which may display one or more available functions, options, and/or settings that may be selected by a user. The control panel may also include physical selection buttons that allow a user to select different menus, scroll through options and settings, and ultimately carry out a selected function.

Even more modern control panels may include a touch screen, which may combine a display screen and selection buttons into a single user interface display. A user may interact with the user interface to select menus, settings, and options by physically interacting with the touch screen.

However, a typical touch screen control panel may include only one function on a given menu screen at a time. In addition, the control panel may require multiple selections coupled with navigation through multiple screens to execute a given function. As such, a user must be familiar with multiple menus, options windows, and/or settings screens in order to find and execute a desired function with desired settings.

Furthermore, a user wishing to perform a series of functions in short succession may be required to perform multiple complex steps or selections. For example, a user wishing to scan a document into MFP storage, and then make 10 copies of the scanned document must perform multiple separate steps, which may require navigation through a scanning menu, MFP storage menu, and copy menu. This procedure may require a user to spend time understanding how to properly navigate and make the correct selections.

As an alternative approach, the present disclosure may relate to a quick operation user interface. The disclosed examples may show an efficient use of the real estate of a control panel display, creating an effective and intuitive user interface.

For instance, an example method may include displaying a primary screen, wherein the primary screen includes a plurality of function menus, each function menu corresponding to a function of an MFP. Each function menu may include a function icon, one or more major-setting icons, an execution icon, and an expansion icon. Each icon in a function menu may correspond to one or more aspects of the function corresponding to the function menu. For instance, a function icon may include a copy icon, major-setting icons may correspond to primary copy settings, an execution icon may correspond to a command to execute a copy function, and an expansion icon may expand the copy function menu such that it includes additional major-setting icons.

The example method may further include, responsive to receiving an input corresponding to a selection of the major-setting icon, modifying the primary setting that corresponds to the selected major-setting icon. This may include, for example, changing the number of copies to be made from one to ten.

In addition, the example method may include, responsive to receiving an input corresponding to a selection of the execution icon, causing the MFP to carry out the function corresponding to the selected execution icon. This may include, for example, causing the MFP to make ten copies of a document.

The example method may also include, responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes. This may include, for example, displaying the copy menu larger and including additional major-setting icons, such as paper selection and color, for example.

Further, the example method may include, responsive to receiving an input corresponding to a selection of the function icon, displaying a secondary screen, wherein the secondary screen includes one or more major-setting icons corresponding to one or more primary settings of the function corresponding to the selected function icon, and one or more minor-setting icons corresponding to one or more secondary settings of the function corresponding to the selected function icon. This may include, for example, displaying a secondary screen including major copying settings as well as minor copying settings. In some cases this may include displaying the secondary screen along with the primary screen, instead of the primary screen, or overlaid on a portion of the primary screen. Other orientations are possible as well.

II. Example User Interface

FIG. 1 is a diagram illustrating an example user interface 100 according to an embodiment of the present disclosure. In one example, user interface 100 may be implemented as part of a computing device, such as computing device 500 described in more detail below with respect to FIG. 5. User interface 100 may include a display, which may be configured to display primary and secondary screens as described in this disclosure. In one example, the display may include a touch screen display. Other types of displays and/or screens are possible as well.

User interface 100 may include primary screen 102. In some examples, primary screen 102 may be a default screen, such that it is displayed automatically upon start-up of a connected MFP. Primary screen 102 may include function menus 104A-D. Each function menu may correspond to one or more functions of an MFP. For instance, in FIG. 1 function menus 104A-D correspond to the functions "Copy," "Scan," "Fax," and "Box," (i.e., document storage). Other functions are possible as well, such as "Email," "Print," "Printer Status," "Maintenance," and "Management," for example. In one example, primary screen 102 may include four function menus, as shown in FIG. 1. In other examples, two or more function menus may be included, corresponding to two or more MFP functions.

Function menus may be included in primary screen 102 based on their corresponding functions. In addition, function menus may be included based on the most popular functions, most used, most recently used, last used, based on an account or signed-in user, based on an algorithm, or based on a default setting. In one particular example, user interface 100 may receive user identification data, which may correspond to a user of the user interface and/or a connected MFP. Primary screen 102 may then include a plurality of function menus corresponding to the received user identification data.

Function menus 104A-D in primary screen 102 may include function icons 106A-D, major-setting icons 108A-J, execution icons 110A-D, and expansion icons 112A-D.

In one example function menu 104A, corresponding to a "Copy" function, may include function icon 106A, which may also correspond to the "Copy" function. Function icon 106A may include a graphic, image, symbol, and/or text that corresponds to the "copy" function. For example, function icon 106A includes a depiction of two documents and the text "Copy." As another example, function icon 106B, which may correspond to a scanning function, may include a document graphic and the text "Scan." As yet further examples, function icon 106C may include a fax machine graphic and the text "Fax," and function icon 106D may include a document box graphic and the text "Box," which may correspond to the storage function of a connected MFP.

Function icons 106A-D may include other graphics, images, symbols, and/or text corresponding to various MFP functions.

Function menus 104A-D may include one or more major-setting icons 108A-J. For example, function menu 104A may include major-setting icons 108A-E. Major-setting icons 108A-E may correspond to one or more primary settings of the "Copy" function (i.e., the function corresponding to the function menu). In the example shown in FIG. 1, the one or more primary settings for the "Copy" function may include setting the paper selection (108A), duplex setting (108B), combine setting (108C), color (108D), and number of copies (108E). Other example settings, which may be primary or secondary settings, may include changing the input or output size, resolution, orientation, output destination, color balance, hue adjustment, sharpness adjustment, background density, positioning, borders, form overlay, page numbering, and rotation of a document, for example. Many other settings are possible as well.

Each function menu may include one or more major-setting icons based on the most popular settings, most used, most recently used, last used, based on a user account or signed-in user, based on an algorithm, or based on a default setting, for example. Other parameters for including major-setting icons may be used as well.

In some examples, each function menu may include different major-setting icons from other menus. For instance, the "Copy" function menu (104A) may include major-setting icons 108A-E described above. The "Scan" function menu (104B) may include major-setting icons 108F and 108G, which may correspond to the most recently used scanning destinations and the address book. Other example settings for the "Scan" function may include scan resolution, file format, continuous scan, web services on devices (WSD) scan, destination, color, and zoom, for example. The "Fax" function menu (104C) may include major-setting icons 108H and 108I, which correspond to a number pad and address book. Other example settings for the "FAX" function may include transmission settings, reception settings, resolution, density, dialing settings, communication settings, and reporting settings. The "Box" function menu (104D) may include major-setting icon 108J, which may correspond to a folder storage structure on a connected MFP. Other settings for the "Box" function may include shortcuts to one or more files, destination settings, file management, and storage settings, for example.

Each major-setting icon may include graphics, images, symbols, and/or text that correspond to the setting. Each major-setting icon may also include buttons, parameters, values, amounts, and/or other selectable items. For example, FIG. 1 shows major-setting icons 108A-J as boxes with various texts inside, wherein each text corresponds to the setting.

Function menus 104A-D may include execution icons 110A-D, wherein each execution icon corresponds to a decision to carry out the function of a corresponding function menu. For example, function menu 104A may include execution icon 110A, which may correspond to a decision to carry out the "Copy" function corresponding to function menu 104A. Each execution icon may include graphics, images, symbols, and/or text specific to the corresponding function. For instance, execution icon 110A may include the text "start," which may correspond to starting the copy function. Execution icon 110B may include the text "Start Scan," which may correspond to starting the scan function of function menu 104B. Execution icon 110C may include the text "Start FAX," which may correspond to starting the fax function. Further, execution icon 110D may include the text "Start Store," which may correspond to starting the box function, which may include storing one or more documents on a connected MFP.

Function menus 104A-D may include expansion icons 112A-D. For example, function menu 104A may include expansion icons 112A. Each expansion icon may include a graphic, image, symbol, and/or text, and may allow a user to expand or collapse one or more function menus. In some examples, the expansion icon of an expanded function menu may be indicated by a different size, shape, color, graphic, or text from the other expansion icons. For instance, expansion icon 112A in FIG. 1 is displayed as an empty box, whereas expansion icons 112B-D are displayed as filled in boxes. The expanded function menu may be referred to as a selected menu, and may include more major-setting icons than as an un-expanded or non-selected function menu.

III. Example Operations

Figure 2A:
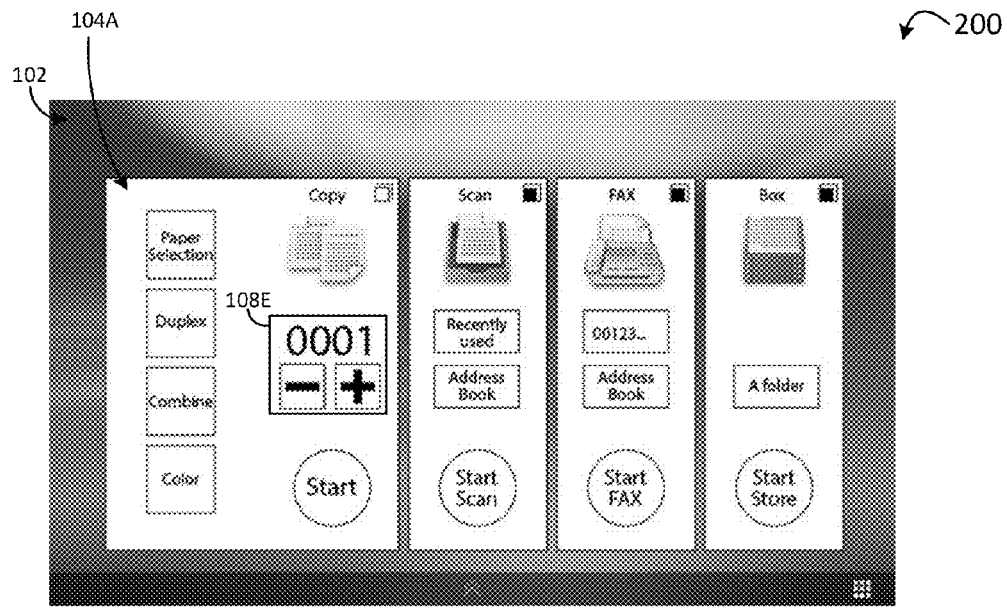
FIG. 2A is a diagram illustrating an example user interface in a first state according to an embodiment of the present disclosure.
Figure 2B:
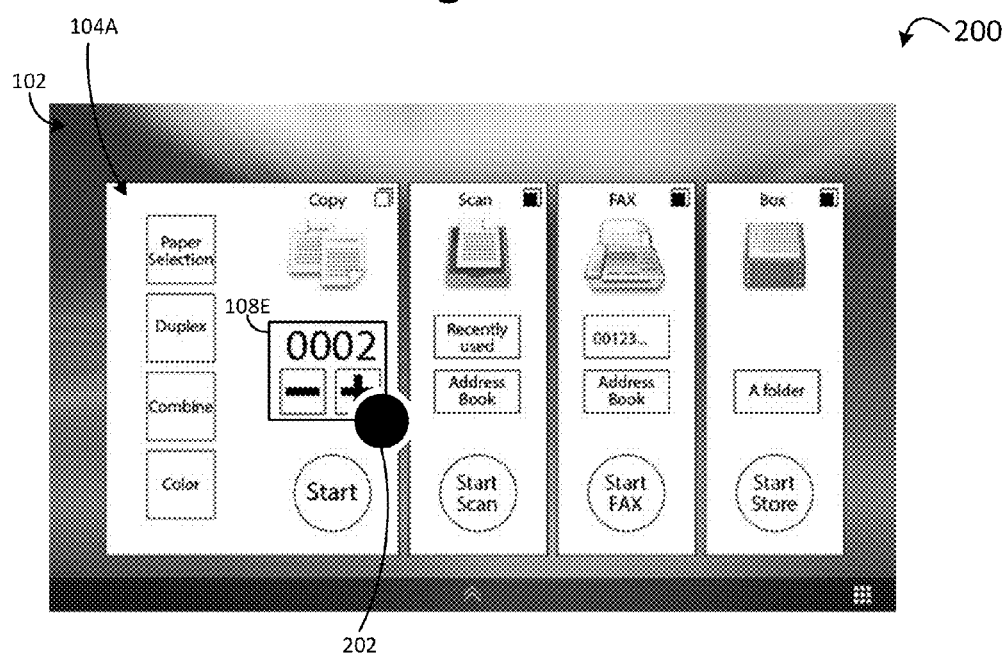
FIG. 2B is a diagram illustrating the example user interface in a second state according to an embodiment of the present disclosure.
Figure 2C:
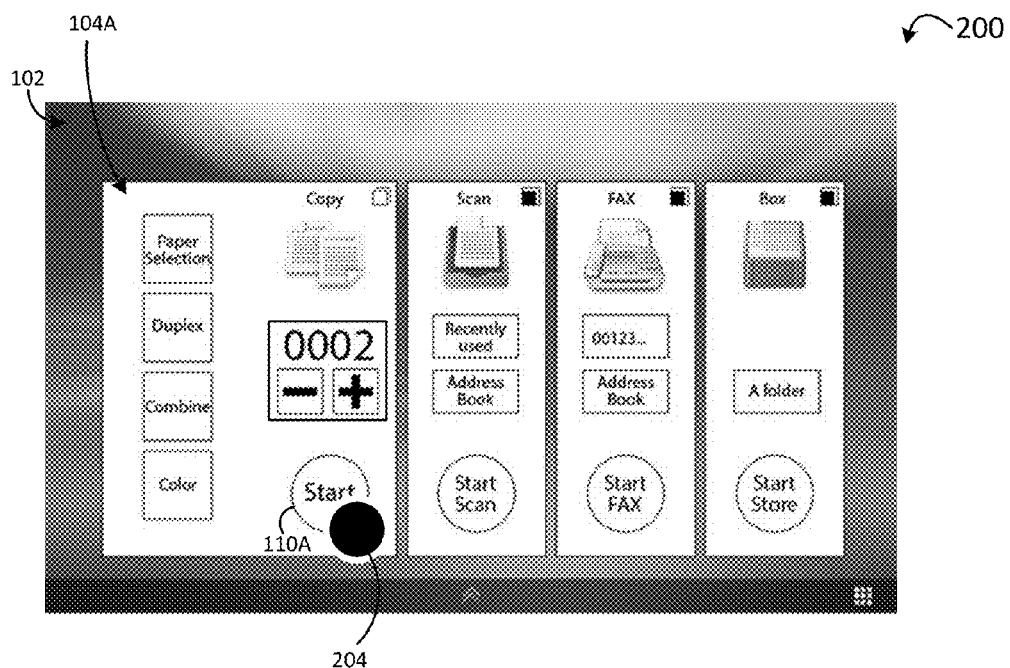
FIG. 2C is a diagram illustrating the example user interface in a third state according to an embodiment of the present disclosure.
Figure 3A:
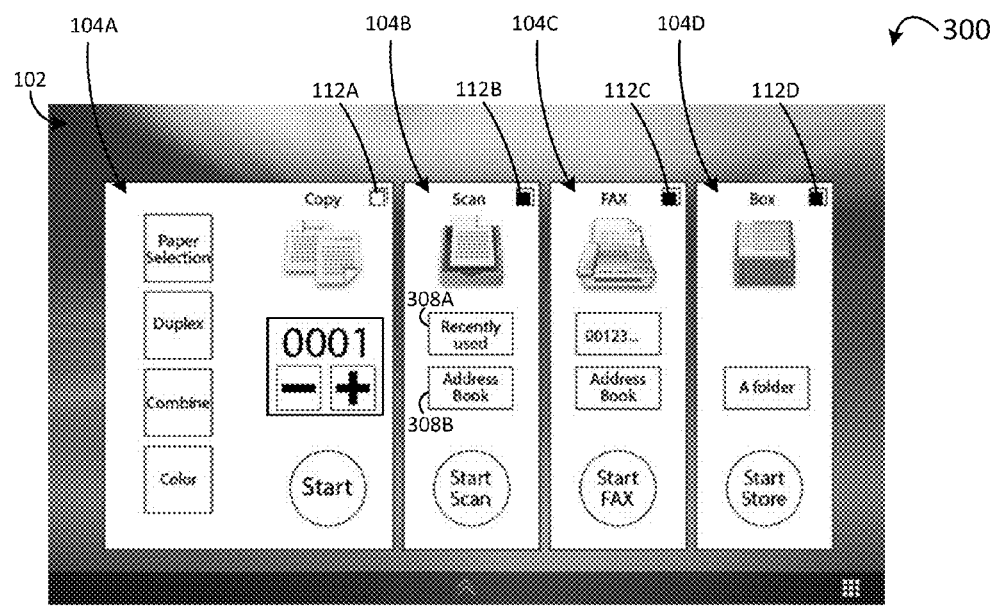
FIG. 3A is a diagram illustrating a second example user interface in a first state according to an embodiment of the present disclosure.
Figure 3B:
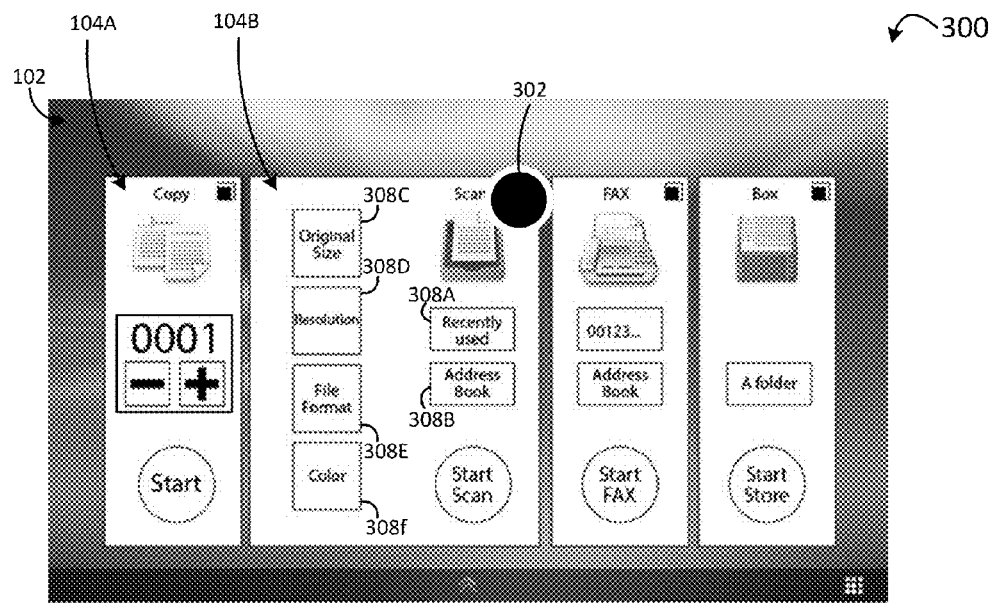
FIG. 3B is a diagram illustrating the second example user interface in a second state according to an embodiment of the present disclosure.
Figure 4A:
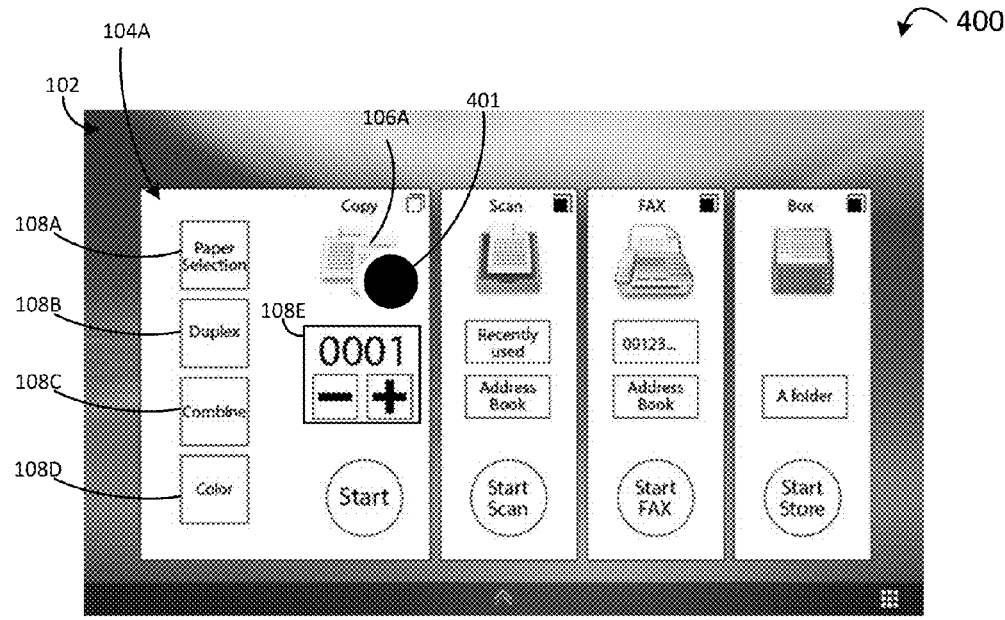
FIG. 4A is a diagram illustrating a third example user interface in a first state according to an embodiment of the present disclosure.
Figure 4B:
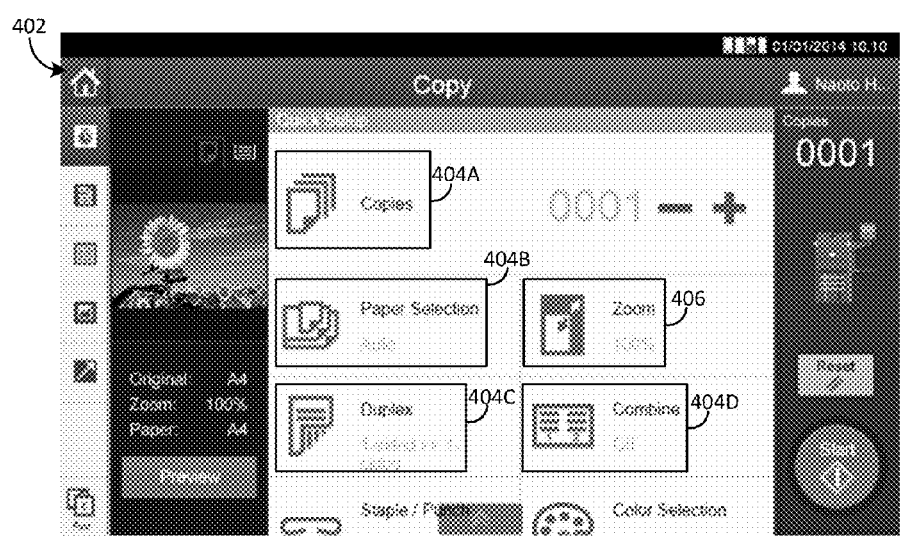
FIG. 4B is a diagram illustrating the third example user interface in a second state according to an embodiment of the present disclosure.

FIGS. 2-4 illustrate example user interfaces in various states according to embodiments of the present disclosure. FIGS. 2A and 2B illustrate a first and second state of an example user interface 200, wherein a major-setting icon has been selected in FIG. 2B. FIG. 2C illustrates the user interface 200 in a third state, wherein the execution icon has been selected. FIGS. 3A and 3B illustrate a first and second state of an example user interface 300, wherein an expansion icon has been selected in FIG. 3C. FIGS. 4A and 4B illustrate a first and second state of an example user interface 400, wherein a function icon has been selected in FIG. 4B.

The transition between the states shown in FIGS. 2-4 may occur due to the selection of one or more icons. User interfaces 200, 300, and 400 may be configured to receive one or more inputs corresponding to the selection of one or more icons. For example, an input may include receiving a selection of an icon or portion of an icon with a cursor. The cursor may be controlled using a mouse or track pad, for example. In other examples, an input may include a touch screen receiving contact, such as from a user's finger, or stylus, for example. In still other examples, an input may include using a peripheral device to select an icon or portion of an icon (e.g., via a mouse, keyboard, keypad, or directional pad). Other mechanisms for controlling a user interface are possible as well.

In a particular example, a touch screen may be used to display the primary and secondary screens, in addition to receiving one or more inputs. The one or more inputs may correspond to a selection of an icon, and may include the user interface receiving contact in an area of the touch screen currently displaying an icon, surrounding an icon, or near an icon. In one example, an input may correspond to a location on a touch screen. The user interface may then determine that the location corresponds to a function. In other examples, the selection may include the user interface receiving contact in an area corresponding to an icon, which may or may not be directly related to the location of the icon on the screen (e.g., a designated area or zone of the touch screen).

FIG. 2A illustrates a first state of an example user interface 200, which may be similar or identical to user interface 100 described above. User interface 200 may include primary screen 102, which may include one or more function menus. In particular, primary screen 102 in FIG. 2A includes function menu 104A, which may correspond to a "Copy" function of an MFP. Function menu 104A may include major-setting icon 108E, which may correspond to a primary setting of the "Copy" function, namely the number of copies to be made. In FIG. 2A, major-setting icon 108E includes a graphic indicating that only one copy is currently set to be made, designated by "0001."

User interface 200 may be configured to receive an input corresponding to a selection of a major-setting icon, and, responsive to receiving the input, modify the primary setting that corresponds to the selected major-setting icon. For instance, user interface 200 in FIG. 2B includes a modified major-setting icon 108E, indicating that two copies are to be made. FIG. 2B includes selection point 202, which may correspond to a received input (e.g., contact with a touch screen). In this case, selection point 202 indicates that a user has selected major-setting icon 108E. In particular, the user has selected a portion of the icon that includes a "plus" graphic. As such, the primary setting corresponding to the number of copies has been modified such that two copies are set to be made, designated by "0002."

Selecting other major-setting icons may result in other primary settings being modified. For instance, some modification may include changing paper selection from one type to another (e.g., A4 to Letter), changing a printer from duplex printing to non-duplex printing, changing the number of pages printed per sheet (e.g., printing two pages per sheet instead of one), or changing from color to black and white, for example. Other modifications are possible as well. In some examples, the result of a modification may depend upon the function menu to which the major-setting icon corresponds. In other examples, the result of a modification may depend upon an account, or a signed-in user.

Selecting a major-setting icon may change the icon itself in addition to changing a corresponding primary setting. For example, as described above, a graphic showing the number of copies to be made may change when the icon is selected (i.e., changing from "0001" to "0002"). In other examples, graphics, images, symbols, and/or text included as part of a major-setting icon may change responsive to a selection of the icon. For instance, a major-setting icon may include text displaying the type of paper currently selected, which may change from "A4" to "Letter" when selected, for example. As another example, text included in a major-setting icon may change from "Color" to "Black and White." Other graphic, image, symbol, and text changes may occur as well.

FIG. 2C illustrates a third state of user interface 200, in which execution icon 110A has been selected. FIG. 2C includes selection point 204, which may correspond to a received input. In this case, selection point 204 indicates that a lower portion of execution icon 110A has been selected. Responsive to the user interface receiving the input, a connected MFP may perform the function corresponding to function menu 104A (i.e., copy a document).

In some examples, the user interface may transmit a command to a connected MFP via a communication network or path, responsive to receiving an input corresponding to a selection of an execution icon. The MFP may then, responsive to receiving the command, carry out the function corresponding to the selected execution icon. In some cases, the function may be carried out using the current settings. For instance, in a case where execution icon 110A in FIG. 2C is selected, a connected MFP may carry out the "copy" function by making the number of copies indicated by the display (i.e., two copies), and having the paper selection, duplex, combine, and color settings currently selected.

In some examples, an execution icon may be modified after or during the time it is selected. For instance, an execution icon may change shape, color, text, or another attribute to indicate the icon has been selected. In another instance, the execution icon may change to indicate that the corresponding function is currently being executed.

FIGS. 3A and 3B illustrate a first and second state of an example user interface 300 according to an embodiment of the present disclosure, wherein an expansion icon has been selected in FIG. 3B. FIG. 3A illustrates a first state of example user interface 300, which may be similar or identical to user interface 100 described above. User interface 300 may include primary screen 102, which may include one or more function menus 104A-D. Each function menu 104A-D may include an expansion icon 112A-D, as well as one or more major-setting icons. For instance, Function menu 104B may include major-setting icons 308A and 308B, which may correspond to recently used addresses and an address book respectively.

User interface 300 may be configured to receive an input corresponding to a selection of an expansion icon, and, responsive to receiving the input, display the function menu corresponding to the selected expansion icon as a selected menu, wherein the selected menu is displayed larger than the function menu, and wherein the selected menu includes more major-setting icons than the function menu includes.

In an example illustrated by FIG. 3B, user interface 300 is shown in a second state, wherein expansion icon 112B has been selected. As a result of the selection, function menu 104B has become the selected menu, and is displayed larger and includes more major-setting icons (i.e., six major-setting icons instead of two). Specifically, function menu 104B in FIG. 3B is a selected menu, including six major-setting icons (i.e., 308A-F) instead of only two, as shown in FIG. 3A. In addition, responsive to receiving an input corresponding to a selection of expansion icon 112B, user interface 300 displays the selected menu larger than the function menu in FIG. 3A.

In some examples, when an expansion icon corresponding to one function menu is selected, causing that function menu to expand, another function menu may contract. For instance, function menu 104A in the example shown by FIGS. 3A and 3B contracts in size when expansion icon 112B is selected. As such, in some examples only one function menu may be a selected menu at any time. Any previously selected function menus or expanded function menus may contract when an expansion icon is selected, such that only one function menu is expanded at any time.

FIGS. 4A and 4B illustrate a first and second state of example user interface 400, wherein function icon 106A has been selected in FIG. 4B.

FIG. 4A illustrates a first state of example user interface 400, which may be similar or identical to user interface 100 described above. User interface 400 may include primary screen 102, which may include function menu 104A. Function menu 104A may include one or more major-setting icons 108A-E and a function icon 106A. FIG. 4A may also include selection point 401, which may correspond to a received input (e.g., contact with a touch screen). In this case, FIG. 4B shows a second state of user interface 400 in which function icon 106A has been selected.

Responsive to receiving the input corresponding to a selection of function icon 106A, user interface 400 may display a secondary screen, wherein the secondary screen comprises one or more major-setting icons corresponding to one or more primary settings of the function corresponding to the selected function icon, and one or more minor-setting icons corresponding to one or more secondary settings of the function corresponding to the selected function icon.

In one example, responsive to a selection of function icon 106A corresponding to the "Copy" function, user interface 400 may display secondary screen 402. Secondary screen 402 may include major-setting icons 404A-D, which may correspond to primary settings of the "Copy" function. The major-setting icons included in secondary screen 402 may be similar or identical to the major-setting icons included in primary screen 102. In some examples, primary settings may include the most popular settings, most used, most recently used, last used, settings based on an account or signed-in user, based on an algorithm, or based on a default setting, for example. Other parameters may be used as well.

Secondary screen 402 may also include one or more minor-setting icons. For instance, secondary screen 402 in FIG. 4B includes minor-setting icon 406, which corresponds to a secondary setting of the "Copy" function. In some examples, secondary settings may include all settings other than those settings determined to be major-setting icons based on one of the parameters discussed above. In other examples, secondary settings may include the least popular settings, least used settings, settings determined based on an account or signed-in user, based on an algorithm, or based on a default setting, for example.

IV. Example Computing Device

Figure 5:
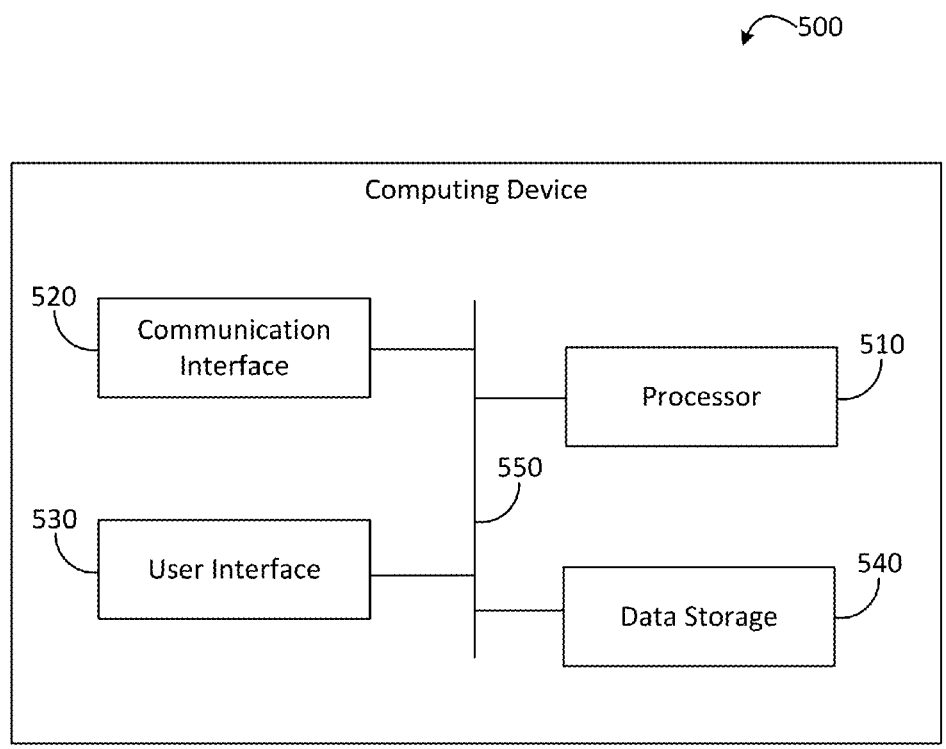
FIG. 5 is a diagram illustrating an example computing device according to an embodiment of the present disclosure.

FIG. 5 is a block diagram illustrating an example computing device 500 according to an embodiment of the present disclosure. Computing device 500 may be configured for performing a variety of functions or acts, such as those described in this disclosure (including the accompanying drawings). In some examples, computing device 500 may be configured to perform one or more herein-described functions or acts, in particular those functions or acts described in connection with user interface 100, 200, 300 and 400. Computing device 500 may include various components, including for example, one or more processors 510, communication interfaces 520, user interfaces 530, and data storages 540. The components of the computing device 500 may be communicatively connected to each other (or other devices or systems) via a system bus, network, or other link 550.

Processor 510 in computing device 500 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor 510 may be configured to execute computer-readable program instructions contained in data storage 540, and/or other instructions as described herein.

Communication interface 520 in computing device 500 may be configured to allow computing device 500 to communicate with one or more devices (or systems) according to one or more protocols. In one example, communication interface 520 may be a wired interface, such as an Ethernet interface or a USB interface. As another example, communication interface 520 may be a wireless interface, such as a cellular or WiFi interface, for example. Other example communication interfaces may include an Ethernet connection, Universal Serial Bus (USB) connection, fiber-optic link, coaxial cable, Bluetooth, ZigBee, WiMAX, wireless wide-area network (WWAN), infrared communication, and/or other similar types of interfaces.

User interface 530 in computing device 500 may facilitate interaction with a user of the computing device, if applicable. As such, user interface 530 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system. User interface 530 may include functions and features such as those above with reference to user interfaces 100, 200, 300, and 400.

Data storage 540 in computing device 500 may include one or more volatile, non-volatile, removable, and/or non-removable storage components, such as magnetic, optical, or flash storage, and may be integrated in whole or in part with processor 510. Further, data storage 540 may take the form of a non-transitory computer-readable storage medium, having stored thereon program instructions (e.g., compiled or non-compiled program logic and/or machine code) that, when executed by processor 510, cause computing device 500 to perform one or more functions or acts, such as those described in this disclosure. Such program instructions may define or be part of a discrete software application that can be executed in response to certain inputs received from user interface 530, for instance. Data storage 540 may also store other types of information or data, such as those types described throughout this disclosure (e.g., authentication data, document data, and document lists).

V. Example Methods

Figure 6:
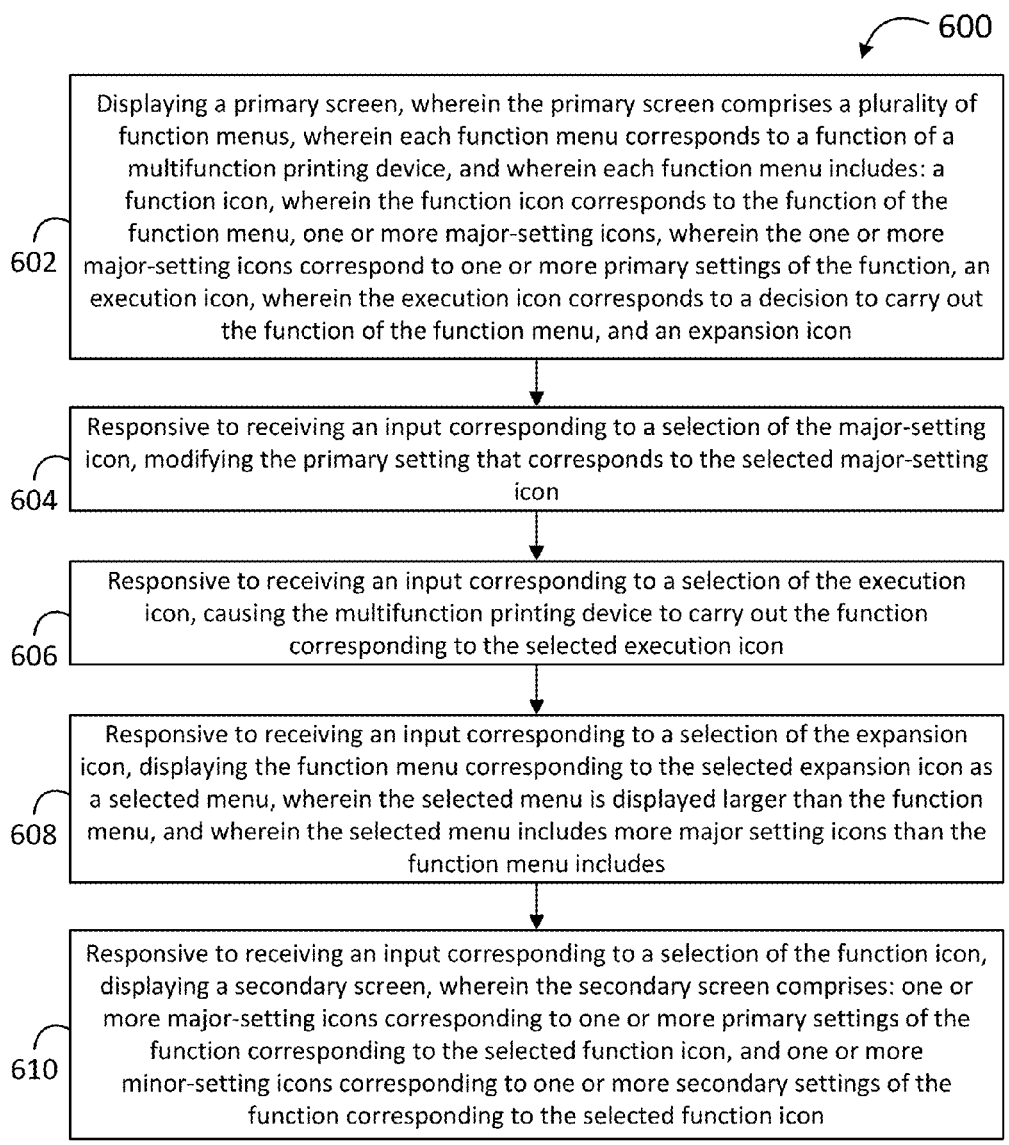
FIG. 6 is a flow chart illustrating an example method according to an embodiment of the present disclosure.

FIG. 6 is a flow chart illustrating an example method 600 according to an embodiment of the present disclosure. Although FIG. 6 illustrates method 600 as including certain blocks in a particular order, it should be noted that blocks may be added, subtracted, and/or carried out in a different order while remaining within the scope of this disclosure. Furthermore, some or all of the blocks of method 600 may be carried out by computing device 500, and may make use of user interfaces 100, 200, 300, and/or 400.

Method 600 may include blocks 602-610. At block 602, method 600 may include displaying a primary screen, wherein the primary screen comprises a plurality of function menus, wherein each function menu corresponds to a function of a multifunction printing device, and wherein each function menu includes: a function icon, wherein the function icon corresponds to the function of the function menu; one or more major-setting icons, wherein the one or more major-setting icons correspond to one or more primary settings of the function; an execution icon, wherein the execution icon corresponds to a decision to carry out the function of the function menu; and an expansion icon.

At block 604, method 600 may include, responsive to receiving an input corresponding to a selection of the major-setting icon, modifying the primary setting that corresponds to the selected major-setting icon. As discussed above, an input may take the form of a selection using a mouse, keyboard, touch screen, or other mechanism. In some examples, modifying the primary setting that corresponds to the selected major-setting icon may include transmitting a command to a connected MFP requesting the modification. In other examples, responsive to receiving an input selecting a major-setting icon, the major-setting icon may change in shape, color, displayed graphic, text, or in some other way. The change may indicate that the icon selection has been made.

In still other examples, responsive to receiving an input selecting a major-setting icon, a second menu may be displayed, which may include one or more setting options for the selected major setting. For instance, when a major-setting icon corresponding to "Paper Selection" is selected, a second menu may be displayed including one or more types of paper that may be selected. In some examples, the second menu may be displayed in addition to the plurality of function menus, and may be overlaid on top of the function menus.

At block 606, method 600 may include, responsive to receiving an input corresponding to a selection of the execution icon, causing the multifunction printing device to carry out the function corresponding to the selected execution icon. As described above, in some examples, a command may be transmitted to the MFP that may include instructions to execute a function.

At block 608, method 600 may include, responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes. In some examples, when an expansion icon corresponding to a function menu is selected, one or more other function menus may decrease in size. For instance, a user interface may include four function menus, one of which is currently expanded. In the case where an expansion icon corresponding to a second function menu is selected (i.e., making the second function menu a selected menu), the first function menu may decrease in size while the selected menu is expanded. In some examples, only one function menu may be expanded at any time. Selecting an expansion icon corresponding to one function menu may cause one or more other function menus to decrease in size, such that only the function menu corresponding to the selected expansion icon is expanded.

At block 610, method 600 may include, responsive to receiving an input corresponding to a selection of the function icon, displaying a secondary screen, wherein the secondary screen comprises: one or more major-setting icons corresponding to one or more primary settings of the function corresponding to the selected function icon, and one or more minor-setting icons corresponding to one or more secondary settings of the function corresponding to the selected function icon. In some examples, the secondary screen may be displayed in place of the primary screen. Alternatively, the secondary screen may be overlaid on top of the primary screen, or a portion of the primary screen.

VI. Other Examples

In some examples, a system may include a touchscreen display, a multifunction printing device, a memory, and a processor, wherein the processor is configured to carry out instructions stored in the memory. The instructions may include displaying a primary screen on the touch screen display, wherein the primary screen comprises a plurality of function menus, wherein each function menu corresponds to a function of the multifunction printing device, and wherein each function menu includes a function icon, wherein the function icon corresponds to the function of the function menu; one or more major-setting icons, wherein the one or more major-setting icons correspond to one or more primary settings of the function; an execution icon, wherein the execution icon corresponds to a decision to carry out the function of the function menu; and an expansion icon. The instructions may also include, responsive to receiving an input corresponding to a selection of the major-setting icon, modifying the primary setting that corresponds to the selected major-setting icon; responsive to receiving an input corresponding to a selection of the execution icon, causing the multifunction printing device to carry out the function corresponding to the selected execution icon; responsive to receiving an input corresponding to a selection of the expansion icon, displaying, on the touch screen display, the function menu corresponding to the selected expansion icon as a selected menu, wherein the selected menu is displayed larger than the function menu, and wherein the selected menu includes more major-setting icons than the function menu includes; and, responsive to receiving an input corresponding to a selection of the function icon, displaying a secondary screen on the touch screen display, wherein the secondary screen comprises one or more major-setting icons corresponding to one or more primary settings of the function corresponding to the selected function icon, and one or more minor-setting icons corresponding to one or more secondary settings of the function corresponding to the selected function icon.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
   displaying a primary screen, wherein the primary screen comprises:
      a plurality of function menus, wherein each function menu corresponds to a function of a multifunction printing device, and wherein each function menu includes:
         a function icon, wherein the function icon corresponds to the function of the multifunction printing device;
         one or more major-setting icons, wherein the one or more major-setting icons correspond to one or more primary settings of the function;
         an execution icon, wherein the execution icon corresponds to a decision to carry out the function of the function menu; and
         an expansion icon;
   responsive to receiving an input corresponding to a selection of the major-setting icon, modifying the primary setting that corresponds to the selected major-setting icon;
   responsive to receiving an input corresponding to a selection of the execution icon, causing the multifunction printing device to carry out the function corresponding to the selected execution icon;
   responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes;
   responsive to receiving an input corresponding to a selection of the function icon, displaying a secondary screen, wherein the secondary screen comprises:
      one or more major-setting icons corresponding to one or more primary settings of the function corresponding to the selected function icon; and
      one or more minor-setting icons corresponding to one or more secondary settings of the function corresponding to the selected function icon; and
   receiving user identification data,
   wherein the plurality of function menus comprises a plurality of function menus corresponding to the received user identification data.

2. The method of claim 1, wherein the primary screen and secondary screen are displayed on a touch screen display.

3. The method of claim 2, wherein receiving an input corresponding to the selection of an icon comprises;
   receiving an input corresponding to a location on the touch screen display; and
   determining that the location corresponds to the function.

4. The method of claim 1, wherein the plurality of function menus comprises a plurality of function menus corresponding to most recently used functions.

5. The method of claim 1, wherein the functions of the multifunction printing device comprise copying, scanning, faxing, and document storage.

6. The method of claim 1, wherein the one or more major-setting icons comprise major-setting icons corresponding to the most recently modified primary settings.

7. The method of claim 1, wherein only one function menu is a selected menu at any time.

8. A system, comprising:
   a touch screen display;
   a multifunction printing device;
   a memory; and
   a processor, wherein the processor is configured to carry out instructions stored in the memory, wherein the instructions comprise:
      displaying a primary screen on the touch screen display, wherein the primary screen comprises:
         a plurality of function menus, wherein each function menu corresponds to a function of the multifunction printing device, and wherein each function menu includes:
            a function icon, wherein the function icon corresponds to the function of the multifunction printing device;
            one or more major-setting icons, wherein the one or more major-setting icons correspond to one or more primary settings of the function;
            an execution icon, wherein the execution icon corresponds to a decision to carry out the function of the function menu; and
            an expansion icon;
      responsive to receiving an input corresponding to a selection of the major-setting icon, modifying the primary setting that corresponds to the selected major-setting icon;
      responsive to receiving an input corresponding to a selection of the execution icon, causing the multifunction printing device to carry out the function corresponding to the selected execution icon;
      responsive to receiving an input corresponding to a selection of the expansion icon, displaying, on the touch screen display, the function menu corresponding to the selected expansion icon as a selected menu, wherein the selected menu is displayed larger than the function menu, and wherein the selected menu includes more major-setting icons than the function menu includes;
      responsive to receiving an input corresponding to a selection of the function icon, displaying a secondary screen on the touch screen display, wherein the secondary screen comprises:

one or more major-setting icons corresponding to one or more primary settings of the function corresponding to the selected function icon; and one or more minor-setting icons corresponding to one or more secondary settings of the function corresponding to the selected function icon; and receiving user identification data, wherein the plurality of function menus comprises a plurality of function menus corresponding to the received user identification data.

9. The system of claim 8, wherein receiving, by the touch screen display, an input corresponding to the selection of an icon comprises;

receiving an input corresponding to a location on the touch screen display; and determining that the location corresponds to the function.

10. The system of claim 8, wherein the plurality of function menus comprises a plurality of function menus corresponding to most recently used functions.

11. The system of claim 8, wherein the functions of the multifunction printing device comprise copying, scanning, faxing, and document storage.

12. The system of claim 8, wherein the one or more major-setting icons comprise major-setting icons corresponding to the most recently modified primary settings.

13. The system of claim 8, wherein only one function menu is a selected menu at any time.

14. A non-transitory computer-readable medium having stored thereon program instructions that, when executed, cause a computing device to perform a set of acts comprising:

displaying a primary screen, wherein the primary screen comprises:

a plurality of function menus, wherein each function menu corresponds to a function of a multifunction printing device, and wherein each function menu includes:

a function icon, wherein the function icon corresponds to the function of the multifunction printing device;

one or more major-setting icons, wherein the one or more major-setting icons correspond to one or more primary settings of the function;

an execution icon, wherein the execution icon corresponds to a decision to carry out the function of the function menu; and an expansion icon;

responsive to receiving an input corresponding to a selection of the major-setting icon, modifying the primary setting that corresponds to the selected major-setting icon;

responsive to receiving an input corresponding to a selection of the execution icon, causing the multifunction printing device to carry out the function corresponding to the selected execution icon;

responsive to receiving an input corresponding to a selection of the expansion icon, displaying the function menu corresponding to the selected expansion icon as a selected menu, wherein the selected menu is displayed larger than the function menu, and wherein the selected menu includes more major-setting icons than the function menu includes;

responsive to receiving an input corresponding to a selection of the function icon, displaying a secondary screen, wherein the secondary screen comprises:

one or more major-setting icons corresponding to one or more primary settings of the function corresponding to the selected function icon; and one or more minor-setting icons corresponding to one or more secondary settings of the function corresponding to the selected function icon; and receiving user identification data, wherein the plurality of function menus comprises a plurality of function menus corresponding to the received user identification data.

15. The computer-readable medium of claim 14, wherein the primary screen and secondary screen are displayed on a touch screen display.

16. The computer-readable medium of claim 15, wherein receiving an input corresponding to the selection of an icon comprises;

receiving an input corresponding to a location on the touch screen display; and determining that the location corresponds to the function.

17. The computer-readable medium of claim 14, wherein the plurality of function menus comprises a plurality of function menus corresponding to most recently used functions.

* * * * *